United States Patent Office 3,736,301
Patented May 29, 1973

3,736,301
CURABLE POLYSULFIDE POLYMERS
Morris Benjamin Berenbaum, 132 Chaumont Drive, Williamsville, N.Y. 14221; and John Michael Pachuta, 9 Alton Road 08619; and Earl Harry Sorg, 108 Greenland Ave. 08638, both of Trenton, N.J.
No Drawing. Filed Aug. 20, 1971, Ser. No. 173,694
Int. Cl. C08g 23/00
U.S. Cl. 260—79
5 Claims

ABSTRACT OF THE DISCLOSURE

A one-package sealant composition consisting essentially of liquid mercaptan-terminated polysulfide polymer having polysulfide groups interconnected by divalent aliphatic hydrocarbon groups wherein the carbon atoms may be interrupted with oxygen atoms, a dual purpose curing agent and adhesion improver which is a mixture of a polyol diacrylate and a polyol triacrylate, said polyols having 2 to 8 carbon atoms, the amount of said acrylate mixture being at least the stoichiometric amount needed to react with the mercaptan groups of said polymer, and a curing catalyst which is an amine-impregnated molecular sieve. The compositions disclosed herein cure rapidly and are especially useful and show good adhesion to vinyl base plastic substrates, acrylonitrilebutadiene-systems (ABS), or polyvinyl chloride or polyvinylidene chloride substrates.

---

This invention relates to polysulfide polymers modified with curing agents; more particularly, this invention relates to liquid polysulfide polymer compositions which have added thereto diacrylate dual purpose curing agents and adhesion promoters, the compositions compounded for use as a two-package composition, a single-package composition and the uses of these curable composition for also providing adhesive bonds for acrylonitrile-butadiene-styrene polymers and between polyvinyl polymers, polyvinyl chloride polymers and polyvinylidene chloride polymers. The use of these compositions is also within the purview of the invention.

In the art of curable liquid polymers and polymer compositions employed as sealant putty or caulking compositions, it has been necessary to improve the adhesion of the sealant or caulking composition to the substrate. Numerous attempts have been made to improve the adhesion of these liquid polysulfide polymers; and although a number of solutions have been proposed, the results are based merely on empirical observation with predictability substantially non-existent. Hence, no predictability can be gathered from the use of the compositions with substrates or different types or substrates which have been pretreated or primed with adhesion promoting materials.

In the prior art are found a number of proposals which require the treatment of the substrate with the adhesion promoters, primers and etching solutions and hence have resulted in more complicated steps to achieve an effective bond between the substrate and the sealant.

Various combinations have also been proposed which have been based on compounding a two-component system and employing the same by mixing the curing agent and/or catalyst with the liquid polymer in the field and applying it to the substrate. As it can be well envisioned, the employment of a two-package system is eminently less desirable than using a single-package system. Although a number of compositions have been proposed in the prior art in both the one-package and two-package systems, these have not solved the encountered problems in respect to the widely varying substrates because an adhesion promoter for a composition useful as a sealant in respect to one substrate is unsatisfactory in respect to a different substrate.

Hence, it is still a desideratum in the sealant art to provide a composition not requiring a substrate pre-coating or priming for the various polysulfide polymer compositions for their improved adhesion and cohesion properties as well as their sealability.

The present invention relates to the simultaneous curability and improvement in the adhesion of polymers structurally represened by the formula

wherein $x$ is an integer of from 1 to 5; $m$ is an integer of from 1 to about 100; R and $R^1$ are bivalent aliphatic radicals such as aliphatic hydrocarbon radicals wherein the carbon atoms may be interrupted with oxygen atoms; and F may be an —SSH group; a hemiacetal or hemiketal group of the structure

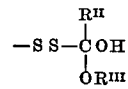

wherein $R^{II}$ may be H or a lower alkyl group and wherein $R^{III}$ may be a lower alkyl group; and —SH group; or an —NH$_2$ group; an

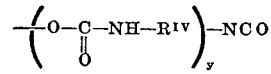

group wherein $R^{IV}$ is selected from alkylene and arylene groups, $y$ is an integer of at least 2 and preferably 2 to 15; and provided, however, that these polymers are mercaptan group terminated or with at least two free mercaptan groups capable of reacting with the acrylates. These polymers have a molecular weight of about 100 to 12,000 and are liquid, i.e. pourable, at room temperature (about 25° C.). These polymers are further defined in U.S. Pat. 3,466,258 incorporated by reference herein.

As a class of materials which has been discovered to serve as a curing agent for the polymers and for improving the adhesion thereof, the acrylates are useful, thus a diacrylate of a polyol—that is, a di- or other polyester of an acrylic acid such as methacrylic acid or acrylic acid and a polyol such as a glycol. Examples of suitable polyols are diethylene glycol, propylene glycol, and trimethylolpropane which constitute the preferred species and which are preferably used in admixture with each other. Other glycols which may be employed are diethylene glycol, dipropylene glycol, dibutylene glycol, tetraethylene glycol, triethylene glycol, neopentyl glycol. As a general rule, the carbon atoms in these glycols range from 2 to 8 carbon atoms.

The unexpected curing and adhesion improving properties of the polysulfide polymer are especially noteworthy when the polysulfide polymer compositions contain a mixture of diethylene glycol diacrylate and trimethylolpropane triacylate.

The liquid polysulfide polymers, when cured, show excellent adhesion without a primer to most vinyl, polyvinylidene chloride as well as acrylonitrile-butadiene-styrene (ABS) substrates. The term "vinyl" substrate is intended herein in its broad sense to mean polymers and resins derived by polymerization or copolymerization or vinyl monomers (vinyl compounds) including vinyl chloride and acetate, vinylidene chloride, methyl acrylate and methacrylate, acrylonitrile, styrene, the vinyl ethers, and numerous others characterized by presence of a carbon double bond in the monomer molecule, which opens during polymerization to make possible the carbon chain of the polymer. A simple case is the conversion of vinyl chloride H$_2$C:CHCl to polyvinyl chloride

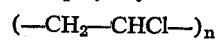

The curable compositions of the present invention may also contain various types of inert materials commonly employed in liquid polysulfide polymer based sealant and caulking compositions such as fillers, plasticizers, pigments, ultraviolet light stabilizers, cure accelerators, and the like. The fillers which may be used in the compositions of the present invention are those materials which have been used in the sealant, caulking and putty composition art. These filler materials include clay materials such as bentonite, titanium dioxide, barium sulfate, carbon black, silica, zinc carbonate, zinc sulfide, magnesium silicate, calcium carbonate, calcium silicate, calcium sulfate, diatomaceous earth, iron oxide, magnesium silicate, and zinc oxide.

Typical co-curing compounds suitable for the disclosed compositions are lead dioxide, calcium peroxide, barium peroxide, tellurium dioxide, and chromate salts such as disclosed in U.S. Pat. 2,964,503. Other curing compounds are oxidizing agents such as described in U.S. Pats. 2,466,963 and 2,402,977 as well as reactive epoxy resins such as described in U.S. Pat. 2,789,958.

Typical sealant formulations which are used, i.e. a black or white filled formulation, have the following composition expressed in parts by weight.

TABLE I.—SEALANT FORMULATIONS

|  | White | Black |
|---|---|---|
| LP-32 polysulfide polymer | 100 |  |
| LP-2 polysulfide polymer |  | 100 |
| Witcarb RC (calcium carbonate) | 30 |  |
| Titanox RA 50 (titanium dioxide) | 10 |  |
| SRF No. 3 (carbon black) |  | 30 |
| Calcium stearate (thixotropic agent) | 1 |  |
| Stearic acid (retarder) | 1 | 0.25 |
| Aroclor 1254 (chlorinated hydrocarbon plasticizer containing 54% Cl) | 5 | 5 |
| HiSil 233 (hydrated silica) | 3 | 2 |
| Sulfur | 0.1 |  |

LP-32 polysulfide polymer has essentially the structure $$HS(C_2H_4)-O-CH_2-O-C_2H_4-S-S-)_{23}$$
$$-CH_2H_4-O-CH_2-O-C_2H_4-SH$$

with about 0.5% crosslinking or branching. LP-2 polysulfide polymer has essentially the same structure as LP-32 polysulfide polymer with about 2% crosslinking or branching imparted by 1,2,3-trichloropropane.

To the above-described formulation is added a mixture of 75:25 equivalent weight blend of diethyleneglycoldiacrylate and trimethylolpropanetriacrylate at 125% of the stoichiometric level. This mixture may be accelerated with an amine catalyst such as triethylene tetramine. Although amines are preferred catalysts, other Lewis bases (e.g., calcium hydroxide), sulfur or iodine may also be employed as a catalyst.

A typical adhesion formulation within the purview of the invention is as follows:

TABLE II

Part A

| | |
|---|---|
| LP-33 | 100 |
| Aroclor 1254 | 7 |
| Sterling R [1] | 30 |
| DEGDA [2] | 16.4 |
| TMPTA | 5.1 |

Part B

| | |
|---|---|
| TETA (triethylene tetramine) | 0.5 |

[1] Sterling R is a trade name of Cabot Corp. for their carbon black.
[2] DEGDA = diethyleneglycoldiacrylate.
[3] 2TMPTA = trimethylolpropanetriacrylate.

TABLE III.—QUALITATIVE ADHESION EVALUATION

|  | Vinyl [1] | ABS | PVC |
|---|---|---|---|
| LP-2: |  |  |  |
| 1 wk. cure at R.T. | AF [2] | CF [3] | CF |
| Plus 1 wk. H₂O immersion | CF | CF | CF |
| LP-31: |  |  |  |
| 1 wk. cure at R.T. | CF | CF | CF |
| Plus 1 wk. H₂O immersion | CF | CF | CF |
| LP-32: |  |  |  |
| 1 wk. cure at R.T. | CF | CF | CF |
| Plus 1 wk. H₂O immersion | CF | CF | CF |

[1] Vinyl = A highly plasticized polyvinyl chloride.
[2] AF = Adhesive failure.
[3] CF = Cohesive failure.

LP-31 polysulfide has essentially the same structure as LP-32 identified above with 0.5% of crosslinking but a molecular weight of about 7,000 and approximate percentage of SH of 0.9%.
LP-33 polysulfide has essentially the same structure as LP-32 above with 0.5% of crosslinking but a molecular weight of 1,000, viscosity of 13 poises and approximate percentage of SH groups of 6.6%.

A composition of LP-2 and LP-31 when admixed with TMPTA and DEGDA is especially stable even after aging two weeks at room temperature and an additional three days at 158° F. in the absence of amine or other Lewis base catalyst. Tetraethylenetetramine catalyst when added to the described composition produces a cure in five minutes.

If the amine is incorporated into the sealant in an ineffectual state, a one-part formulation is obtained which exhibits the same, improved properties. Accordingly, a one-part formulation was prepared which contained 200

TABLE IV.—VISCOSITY (CP.)

| Composition | LP-2 | LP-31 | TMPTA [1] | DEGDA [2] | Initially | 1 day at R.T. | 7 days at R.T. | 14 days at R.T. | 14 days at R.T. plus 3 days at 158° F. | Appearance |
|---|---|---|---|---|---|---|---|---|---|---|
| 1 | 100 |  | 12 |  | 302.4 | 377.6 | 460 | 384 | 435.2 | No change. |
| 2 |  | 100 | 12 |  | 282.4 | 273 | 313.4 | 275.2 | 275.2 | Do. |
| 3 | 100 |  | 6 | 6 | 992 | 1,096 | 1,267 | 1,120 | 427 | Slight gel. |
| 4 |  | 100 | 6 | 6 | 744 | 795 | 818 | 816 | 217 | Do. |

[1] TMPTA = trimethylolpropanetriacrylate.
[2] DEGDA = diethyleneglycoldiacrylate.

parts of LP-32/carbon black, 60 parts Aroclor 1254 (previously described), 8 parts of trimethylolpropane triacrylate, 4 parts diethylene glycol diacylate, and 6 parts of an amine-loaded molecular sieve. The amine used was tetraethylenetetramine. This composition was stable for at least seven days at 55° C. and cured in less than six days at 100% relative humidity. The stability data are summarized in Table IV.

A complete and thorough discussion of the above-described amine-loaded molecular sieve catalyst is found in U.S. Patents 3,402,151 and 3,402,155, which are incorporated herein by reference for the disclosure pertaining to the use of the catalyst, the catalyst systems and the polymers curable therewith. Although amine-loaded molecular sieve catalysts are preferred, other Lewis bases (e.g., sulfur or iodine) may also be employed by being loaded in a molecular sieve.

Thus, still further as an illustration of the present invention, acrylic-type esters are useful as curatives and adhesion additives for the amine-activated $ZnO_2/CaO_2$ co-cure one-package mercaptan terminated polymer compounds. As a general rule, their use in combination with urethane prepolymer Solithane™ 291 adhesion additive enhances cure and adhesion characteristics.

Some additional and typical formulations of three polymer compounds are illustrated in Table V.

TABLE V

| | A | B | C | D |
|---|---|---|---|---|
| AL-622 a | 100 | | | |
| LPTM-32 b | | 100 | 100 | 100 |
| Multifex MM c | 50 | 40 | 40 | 40 |
| Superlith XXX HD d | 20 | 30 | 20 | 20 |
| Benzoflex P-600 e | 10 | 10 | 10 | 10 |
| Aroclor 1254 f | 15 | 15 | 15 | 15 |
| $ZnO_2$ | 4 | 4 | 4 | 4 |
| $CaO_2$ | 6 | 6 | 6 | 6 |
| CZX 121D g | 3 | 3 | 3 | 3 |
| Methyl methacrylate | 1 | 1 | | |
| TEGDM h | | | 7.2 | |
| TMMP i | | | | 5.6 |
| Solithane TM 291 j | | | 5 | |
| 3A molecular sieve k | | 1 | | |
| Thixatrol ST l | | 2 | | |
| Toluene | | 2.5 | | |
| Thixcin R m | | | | | a A polysulfide polymer blend of 8:1 ratio of ZL-541 and ZL-537; ZL-541 is the same as LP-2 but without crosslinking or branching; ZL-537 is 91 parts by weight of ZL-255, 4.8 parts by weight of Aroclor 1242 and 3.4 parts by weight SRF black; ZL-255 is the same as LP-2 but with 4% crosslinking or branching via 1,2,3-trichloropropane.
b Polysulfide polymer previously identified above.
c Precipitated calcium carbonate filler.
d Zinc sulfide filler.
e Polyethylene glycol dibenzoate.
f Chlorinated hydrocarbon plasticizer containing 54% Cl.
g 10% ethylene diamine molecular sieve.
h Triethylene glycol dimethacrylate.
i 1,1,1(tris methacrylatomethyl) propane.
j Urethane prepolymer, a reaction product of linear polyester and toluene diisocyanate.
k Desiccant.
l Thixiotroping agent derived from castor oil.
m Thixiotroping agent derived from castor oil.

The above Table V shows reactive adhesion additives in one-package sealants for obtaining adhesion to a variety of unprimed substrates. Hence, polyfunctional acrylic esters are useful as co-curing/adhesion agents for the identified polymer compounds.

Sealant C possessed good dry adhesion to acrylic enamel, ceramic tile, glass, cold rolled steel, wood, aluminum and porcelain. After seven days' immersion in $H_2O$ at room temperature, adhesion to ceramic tile was fair, good to acrylic enamel, and fair to plasticized vinyl. After $H_2O$ immersion and when Solithane™ 291 is omitted from the formulation, the cured formulation is somewhat soft, but adhesion is improved. Sealant B had good dry adhesion on ceramic tile, porcelain, marine plywood, aluminum, cold rolled steel, chromium plate and glass. Good dry adhesion and good adhesion after seven days' room temperature $H_2O$ immersion to glass, porcelain, ceramic tile and chromium was obtained with sealant A.

TABLE VI.—ACRYLATE CURES OF COMPOSITION ZL-616

| | Formulation A | Formulation B |
|---|---|---|
| Base material: | | |
| Composition ZL-616 a | 100 | 100 |
| Benzoflex 9-88 b | | 100 |
| Curing paste: | | |
| TMPTA c | 6 | 6 |
| DEGDA d | 6 | 6 |
| TETA e | 0.5 | 0.5 |
| Penetration (cm.), initial | .50 | .47 |
| Percent res., initial | 92 | 93 |
| Penetration (cm.), 1 week at 158° F | .33 | .38 |
| Percent res. 1 week at 158° F | 94 | 92 |
| Adhesion to concrete: | | |
| Unprimed: | | |
| 50% mod | | |
| Tensile, p.s.i | (f) | 11.0 |
| Elong., percent | (f) | 45 |
| Failure | (f) | Cohesive |
| Primed: | | |
| 50% mod | 16.5 | |
| Tensile, p.s.i | 30.8 | 12.2 |
| Elongation, percent | 149 | 46 |
| Failure | Cohesive | Cohesive | a Mercaptan terminated polypropylene glycol polymer of a molecular weight of 2,500 to 3,500.
b Polyethylene glycol dibenzoate.
c Trimethylolpropanetriacrylate.
d Diethyleneglycoldiacrylate.
e Triethylenetetramine.
(f) No test.

When the base material described in Table VI was degassed, a water-white, crystal clear sheet was obtained thereby allowing the obtention of white or pastel colored sealants.

Moreover, not only are the diacrylates useful adhesion additives, but these compounds are useful curing agents which improve the final properties of the cured polymer. For example, in equal formulations conventionally cured LP polymers exhibit considerable compression set at elevated temperatures, whereas the acrylate cured polymers show considerably reduced compression set, i.e. when compressed 50% for one hour at 212° F. Also, in sealant applications improved stress relaxation values are indicated for the LP polymers.

What is claimed is:

1. A one-package sealant composition consisting essentially of a liquid mercaptan-terminated polysulfide polymer having polysulfide groups interconnected by divalent aliphatic hydrocarbon groups wherein the carbon atoms may be interrupted with oxygen atoms, a dual purpose curing agent and adhesion improver which is a mixture of a polyol diacrylate and a polyol triacrylate, said polyols having 2 to 8 carbon atoms, the amount of said acrylate mixture being at least the stoichiometric amount needed to react with the mercaptan groups of said polymer, and a curing catalyst which is an amine-impregnated molecular sieve.

2. The polysulfide polymer composition as defined in claim 1 wherein the diacrylate and triacrylate are in a 3:1 equivalent weight blend ratio.

3. The polysulfide polymer composition as defined in claim 1 and wherein the diacrylate is a diethylene glycol diacrylate.

4. The polysulfide polymer composition as defined in claim 1 wherein the triacrylate is a trimethylolpropane triacylate.

5. The polysulfide polymer composition as defined in claim 1 wherein said amine is triethylenetetramine.

References Cited

UNITED STATES PATENTS

| 3,635,864 | 1/1972 | McCarthy et al. | 260—28.5 AS |
| 3,449,301 | 6/1969 | Noll et al. | 260—79 |
| 3,402,155 | 9/1968 | Kutch | 260—79 |
| 3,278,352 | 10/1966 | Erickson | 149—19 |
| 3,415,764 | 12/1968 | Erickson | 260—2.5 |
| 3,466,258 | 9/1969 | Panek et al. | 260—30.8 |

DONALD E. CZAJA, Primary Examiner

M. I. MARQUIS, Assistant Examiner

U.S. Cl. X.R.

117—123 D; 124 E, 127, 138. E, 138.8 UA, 138.8 UF, 148; 260—18 R, 31.8 Z, 33.8 R, 37 R, 79.1, 79.5 C, 858